(12) United States Patent
Pfeifer

(10) Patent No.: US 11,174,625 B2
(45) Date of Patent: Nov. 16, 2021

(54) METHOD AND APPARATUS FOR ISOLATING A PRESSURE-DRIVEN SYSTEM FROM A SOURCE

(71) Applicant: Peter Fredrick Pfeifer, Tyrone, GA (US)

(72) Inventor: Peter Fredrick Pfeifer, Tyrone, GA (US)

(73) Assignee: Truth Holding LLC, Tyrone, GA (US)

( * ) Notice: Subject to any disclaimer, the term of this patent is extended or adjusted under 35 U.S.C. 154(b) by 89 days.

(21) Appl. No.: 16/483,968

(22) PCT Filed: Nov. 28, 2018

(86) PCT No.: PCT/US2018/062859
§ 371 (c)(1),
(2) Date: Aug. 6, 2019

(87) PCT Pub. No.: WO2019/108658
PCT Pub. Date: Jun. 6, 2019

(65) Prior Publication Data
US 2020/0024835 A1    Jan. 23, 2020

Related U.S. Application Data

(60) Provisional application No. 62/591,675, filed on Nov. 28, 2017.

(51) Int. Cl.
*E03B 7/07* (2006.01)
*E03C 1/10* (2006.01)
*G05D 7/06* (2006.01)

(52) U.S. Cl.
CPC .............. *E03B 7/075* (2013.01); *E03B 7/071* (2013.01); *E03B 7/072* (2013.01); *E03C 1/10* (2013.01); *G05D 7/0635* (2013.01)

(58) Field of Classification Search
CPC ... E03B 7/00; E03B 7/006; E03B 7/02; E03B 7/04; E03B 7/071; E03B 7/075; Y10T 137/7761; G05D 7/0623; G05D 7/0635
(Continued)

(56) References Cited

U.S. PATENT DOCUMENTS 3,857,277 A    12/1974  Moore
5,539,384 A     7/1996  Frasier
(Continued)

FOREIGN PATENT DOCUMENTS

EP    2058442 A2    5/2009
GB    2521018 A     6/2015

OTHER PUBLICATIONS

International Search Report by Kramer IP Search dated Nov. 16, 2018.
"Leak Smart 888000 Automatic Shut-Off Valve" (Accessed Nov. 15, 2018).

*Primary Examiner* — Kevin F Murphy
(74) *Attorney, Agent, or Firm* — Thomas | Horstemeyer, LLP

(57) ABSTRACT

An isolation device and method are provided for isolating a plumbing system of a premises from a potable water source if permissible input water pressure parameters are violated. After the plumbing system has achieved a desired input water pressure, the isolation device places the plumbing system in an isolated state and only removes the plumbing system from the isolated state if the isolation device detects a demand for water from the plumbing system and if the isolation device determines that permissible input water pressure parameters are not being violated. Once the demand no longer exists, the isolation device returns the plumbing system to the isolated state.

18 Claims, 4 Drawing Sheets

(58) Field of Classification Search
USPC .......................................................... 700/282
See application file for complete search history.

(56) References Cited

U.S. PATENT DOCUMENTS

| | | | |
|---|---|---|---|
| 6,209,576 | B1 | 4/2001 | Davis |
| 6,245,224 | B1* | 6/2001 | Enoki ..................... C02F 1/008 |
| | | | 137/93 |
| 6,880,567 | B2* | 4/2005 | Klaver .................... F16K 17/04 |
| | | | 137/487.5 |
| 7,574,896 | B1 | 8/2009 | Cooper |
| 8,689,829 | B2 | 4/2014 | Meikle |
| 9,139,986 | B2 | 9/2015 | Smith et al. |
| 9,857,803 | B1* | 1/2018 | Abuda .................... E03B 7/071 |
| 9,857,805 | B2 | 1/2018 | Halimi |
| 10,031,005 | B2* | 7/2018 | Ding ......................... G01F 1/86 |
| 2001/0020801 | A1 | 9/2001 | Belau |
| 2001/0020901 | A1 | 9/2001 | McHugh et al. |
| 2004/0107994 | A1 | 6/2004 | Bartek |
| 2006/0260691 | A1* | 11/2006 | Davidoff ............. G01M 3/2815 |
| | | | 137/487.5 |
| 2008/0266125 | A1* | 10/2008 | Windisch ................ E03B 7/071 |
| | | | 340/605 |
| 2011/0114202 | A1* | 5/2011 | Goseco .................... E03B 7/04 |
| | | | 137/487.5 |
| 2015/0345711 | A1 | 12/2015 | Shepherd |
| 2017/0067232 | A1 | 3/2017 | Colbert et al. |

* cited by examiner

METHOD AND APPARATUS FOR ISOLATING A PRESSURE-DRIVEN SYSTEM FROM A SOURCE

CROSS-REFERENCE TO RELATED APPLICATIONS

The present application is a U.S. national stage nonprovisional application that claims the benefit of and priority to PCI international application number PCT/US2018/062859, which claims the benefit of and priority to the filing date of U.S. provisional application Ser. No. 62/591,675, filed on Nov. 28, 2017 and entitled "DEVICE TO ISOLATE PRESSURE DRIVEN SYSTEMS," which is hereby incorporated by reference herein in its entirety.

BACKGROUND

Potable water is typically delivered to plumbing systems located at various types of premises (e.g., homes, office buildings, hotels, shops) using water pressure to force the water through the plumbing system via a water-main. knowledgeable experts recommend that a supply of clean, potable, water be kept on hand for use in case an emergency event occurs that results in a water pressure extreme, i.e., the water pressure in the water-main being either too low or too high.

There are various types of emergency events that result in the occurrence of a water pressure extreme, such as, for example, weather events, water-main ruptures, terrorism, system failures, and electrical failures. Such events can cut-off a water supply or render it un-potable. If there is a failure in the water delivery system, such as a rupture in the water-main or other failure causing an interruption of the water system pressure, the water pressure drops to a lower level. When the pressure in the delivery system drops, the water in the plumbing system can become contaminated.

If there is a lack of a check valve or a back-flow preventer or if there is a failure of a check valve or back-flow preventer, it is possible for the water contained in the plumbing system to drain back into the water-main. This possibility is, after all, the reason why a check valve and/or a back-flow preventer is required by many jurisdictions, many of which require periodic inspection of the devices.

After such a failure occurs, or if there is no check valve or back-flow preventer, the potable water contained in the plumbing system should be purged, or drained, due to the risk of it being contaminated.

Also, when pressure to the water-main is restored, the potable water contained in the plumbing system can become contaminated, resulting in the need to boil water under "Boil Water Advisories" and/or to purge the water from the plumbing system.

SUMMARY

An isolation device and method for isolating a plumbing system of a premises from a potable water source are provided. In accordance with a representative embodiment, the isolation device comprising a housing, first and second water pressure sensors, a flow sensor, a main valve, and a controller. The housing has an inlet adapted to be connected to a water supply line through which water from the potable water source is intended to flow, and has an outlet adapted to be connected to a plumbing system of a premises. The first water pressure sensor, which is coupled to the housing, senses a water pressure of water flowing through the water supply line and outputs a first measurement signal. The second water pressure sensor, which is coupled to the housing, senses water pressure of water flowing through the plumbing system and outputs a second measurement signal. The main valve is coupled to the housing and disposed in between the first and second water pressure sensors. The main valve is electrically-controllable. The flow sensor senses a flow of water in the isolation device and outputting a third measurement signal. The controller is electrically coupled to the first and second water pressure sensors and to the flow sensor. The controller performs a main valve control algorithm that sends one or more control signals to the main valve to cause the main valve to be placed in an opened position or a closed position based on at least one of the first, second and third measurement signals. When the main valve is in the closed position, water in the plumbing system is isolated from water in the water supply line.

In accordance with an embodiment of the isolation device, the first measurement signal is indicative of the water pressure of water flowing through the water supply line, and the controller causes the main valve to be placed in the opened position if the first measurement signal indicates that the water pressure flowing through the water supply line is greater than a low pressure set point and less than a high pressure set point.

In accordance with an embodiment of the isolation device, the main valve has a normally closed configuration, and the controller causes the main valve to remain in the closed position if the first measurement signal indicates that the water pressure flowing through the water supply line is either less than the low pressure set point or greater than the high pressure set point.

In accordance with an embodiment of the isolation device, the second measurement signal is indicative of the water pressure of water flowing through the plumbing system, and the controller causes the main valve to be placed in the opened position if the first measurement signal indicates that the water pressure flowing through the water supply line is greater than a low pressure set point and less than a high pressure set point and the second measurement signal indicates that the pressure of water flowing through the plumbing system has decreased indicating that a demand for water in the plumbing system exists.

In accordance with an embodiment of the isolation device, if the third measurement signal indicates that the flow of water in the isolation device is such that the demand for water no longer exists, the controller causes the main valve to be placed in the closed position.

In accordance with an embodiment of the isolation device, if the main valve is in the opened position and the first measurement signal indicates that the water pressure flowing through the water supply line is either less than the low pressure set point or greater than the high pressure set point, the controller causes the main valve to be placed in the closed position.

In accordance with an embodiment of the isolation device, the isolation device further comprises a purging valve adapted to permit input flowing through the water supply line to be purged while continuing to isolate the water contained in the plumbing system from the water supply line.

In accordance with an embodiment of the isolation device, the isolation device further comprises an air stem bleeder valve that permits the isolation device to be pressurized or drained during testing of the isolation device.

In accordance with an embodiment of the isolation device, the isolation device further comprises a pressure gauge that visually displays the water pressure of the water flowing in the isolation device.

In accordance with an embodiment of the isolation device, the isolation device further comprises an input device in communication with the controller, and the low pressure set point and the high pressure set point are parameters that are input to the controller by a user via the input device.

In accordance with an embodiment of the isolation device, the low pressure set point and the high pressure set point are parameters that are preset in the controller as factory settings.

In accordance with an embodiment of the isolation device, if the main valve is in the opened position and the controller causes the main valve to be placed in the closed position, the controller outputs an alert signal to an external device to notify a user that the main valve has been placed in the closed position.

In accordance with an embodiment of the isolation device, the controller is in communication with a wireless communications network and wherein the alert signal is sent over the wireless communications network to the external device.

In accordance with an embodiment of the isolation device, the external device is at least one of a computer and a handheld mobile device, and the alert signal is sent over the wireless communications network as at least one of a text, an email and a phone call.

In accordance with an embodiment of the isolation device, the controller is in communication with an Internet of Things (IOT) home controller of the premises, and the IOT home controller communicates at least one of the text, the email and the phone call over the wireless communications network to the external device.

In accordance with an embodiment of the method, the method comprises:

with a first water pressure sensor, sensing a water pressure of water flowing through the water supply line and outputting a first measurement signal;

with a second water pressure sensor, sensing water pressure of water flowing through the plumbing system and outputting a second measurement signal;

with a flow sensor, sensing a flow of water in the isolation device and outputting a third measurement signal; and with a controller electrically coupled to the first and second water pressure sensors and to the flow sensor, performing a main valve control algorithm that sends one or more control signals to a main valve of the isolation device to cause the main valve to be placed in an opened position or a closed position based on at least one of the first, second and third measurement signals.

In accordance with an embodiment of the method, the first measurement signal is indicative of the water pressure of water flowing through the water supply line, and wherein the controller causes the main valve to be placed in the opened position if the first measurement signal indicates that the water pressure flowing through the water supply line is greater than a low pressure set point and less than a high pressure set point.

In accordance with an embodiment of the method, the second measurement signal is indicative of the water pressure of water flowing through the plumbing system, and if the controller has not been placed in an idle mode, the controller causes the main valve to be placed in the opened position if the first measurement signal indicates that the water pressure flowing through the water supply line is greater than a low pressure set point and less than a high pressure set point and the second measurement signal indicates that the pressure of water flowing through the plumbing system has decreased indicating that a demand for water in the plumbing system exists.

In accordance with an embodiment of the method, if the controller has been placed in an idle mode, the controller causes the main valve to remain in the closed position even if the first measurement signal indicates that the water pressure flowing through the water supply line is greater than a low pressure set point and less than a high pressure set point and even if the second measurement signal indicates that the pressure of water flowing through the plumbing system has decreased indicating that a demand for water in the plumbing system exists.

These and other features and advantages of the isolation device and method will be apparent from the following description, drawings and claims.

DETAILED DESCRIPTION

Figure 1:
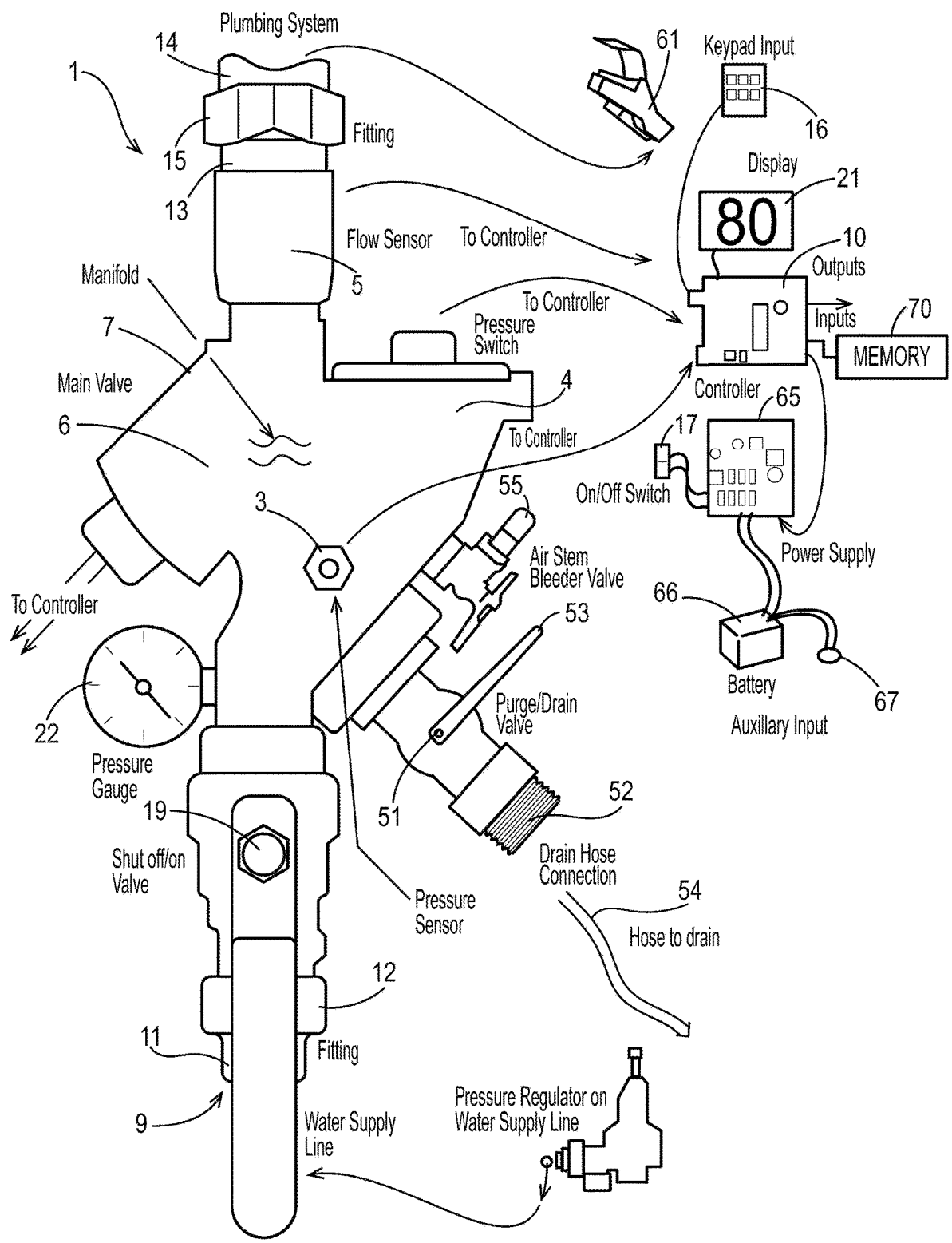
FIG. 1 is an elevation view of the isolation device in accordance with a representative embodiment.

The present disclosure is directed to an isolation device and method for isolating a plumbing system of a premises from a potable water source if permissible input water pressure parameters are violated. After the plumbing system has achieved a desired input water pressure, the isolation device places the plumbing system in an isolated state and only removes the plumbing system from the isolated state if the isolation device detects a demand for water from the plumbing system and if the isolation device determines that permissible input water pressure parameters are not being violated. Once the demand no longer exists, the isolation device returns the plumbing system to the isolated state.

The premises may be a residential, institutional, industrial, or other, premises and the potable water source may be a governmental potable water source, such as that of a municipality, for example, or a private potable water source, such as a private well, for example.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. The term "approximately" means to within an acceptable limit or amount to one of ordinary skill in the art.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "processing device," or "processing logic," as those terms are used herein, are interchangeable and encompass at least one electronic device that is configured to perform one or more processing algorithms that process signals. The electronic device(s) may perform the algorithm(s) in hardware, software or firmware, or a combination thereof. References herein to a system comprising "a processor" or "a processing device" or "processing logic" should be interpreted as one or more processors or processing cores. The processor may, for instance, be a multi-core processor. A processor may also refer to a collection of processors within a single computer system or distributed amongst multiple computer systems. Instructions of a computer program can be performed by a single processor or by multiple processors that may be within the same device or that may be distributed across multiple devices. The term "controller," as that term is used herein, denotes an electronic device that comprises a processor, a processing device or processing logic, as those terms are defined herein.

Potable water is typically delivered to plumbing systems of premises using water pressure to force the water through the plumbing system via a water-main. The isolation device isolates the plumbing system from the potable water source in the event of water pressure extremes, preferably both when the pressure is too low and when the pressure is too high.

In accordance with a representative embodiment, the isolation device uses pressure sensors/switches to control a normally closed main valve. The main valve permits water flow from the potable water source via a main water supply line (e.g., a water-main) into the plumbing system or blocks water flow from the main into the plumbing system depending on the results of the measurements by first and second water pressure sensor and by at least a first flow sensor, as will be described below in detail.

It is recommended by knowledgeable experts that a supply of clean, potable, water be kept on hand for emergency use. There are various types of emergency situations such as, for example, weather events, water-main ruptures, terrorism, system failures, and electrical failures that can disrupt, or cut off, a water supply or render it un-potable. If there is a failure in the water delivery system, such as a rupture in the water-main or other failure causing an interruption of the water system pressure, the water pressure drops to a lower level. When the pressure in the delivery system drops, the water in the system can become contaminated.

If there is a lack of a check valve or a back-flow preventer or if there is a failure of a check valve or back-flow preventer, it is possible for the water contained in the plumbing system to drain back into the water-main. This possibility is, after all, the reason why a check valve and/or a back-flow preventer is required by many jurisdictions, many of which require periodic inspection of the devices.

It is desirable to prevent the draining of the potable water contained in the plumbing system if there is a lack of a functioning check valve or backflow preventer, in order to preserve that potable water as an emergency water supply.

In addition to preventing the draining of the water contained in the plumbing system, it is also desirable to isolate the plumbing system when water pressure is restored to prevent contamination of the clean water contained in the plumbing system of residential, industrial and institutional premises. Such action preserves the potable water contained in the system and can also exclude the need to boil water under "Boil Water Advisories" if no intrusion of potentially contaminated water was permitted, as it would be unless closed off by the isolation device. Such isolation can also eliminate the need to flush pipes, faucets, water coolers, automatic ice makers, water softeners, hot water heaters, etc. Isolating the plumbing system in this manner also eliminates the need to replace any filters in plumbing system, which is typically one of the recommendations under a "Boil Water Advisory."

The isolation device and method disclosed herein eliminate these needs under a "Boil Water Advisory" while also permitting the input water to be purged of any suspected contaminated water if the plumbing system.

In addition, the isolation device provides an automatic warning system for overly high pressure in the plumbing system that can lead to plumbing system component damage and failure. High pressure has a detrimental effect on plumbing systems. High pressure can be the result of a pressure regulator failure, for example. High pressure can damage components of the plumbing system such as valves, tanks and fittings. Often, it is the failure of components such as leakage from hot water heaters that is the first indication that there has been a pressure regulator failure. Preferably, the isolation device continuously, or at least periodically, monitors pressure so that overly high pressure is detected when it first occurs.

There have been a variety of proposed solutions for the storage of a supply of fresh, clean, potable water for emergency use. They all have disadvantages, such as, for example: (1) they do not provide for a continuous flow of fresh, clean, potable water to be stored; (2) they do not contain or isolate the water from contamination; (3) they require the purchase of water in containers that need to be rotated with new water to provide fresh water, requiring ongoing expense; or (4) they are not automatic and require manual filling of the storage devices. None of the known proposed solutions provide protection of the plumbing system from pressure that is too high.

The isolation device and method disclosed herein provide a solution that overcomes the disadvantages of the proposed solutions by automatically preserving a supply of clean, potable water contained within the plumbing system while protecting the plumbing system from water pressure that is too high. Other features and advantages of the isolation device and method are described below in more detail.

The isolation device is adapted to be installed in a public or private water feed between the potable water source and the plumbing system of a premises at a location that preferably is upstream of any divergent piping branches of the plumbing system that may lead to hot water heaters, water storage tanks, sinks, ice-makers, filters, washing machines, tubs, showers, toilets, etc., but downstream of any non-potable water uses such as irrigation systems or fire suppression systems.

FIG. 1 is an elevation view of the isolation device 1 in accordance with a representative embodiment. The isolation device 1 is shown as having a particular shape and particular components, but it may have other shapes and some of the components shown in FIG. 1 are optional, as will be described below in more detail. First and second water pressure sensors 3 and 4 of the isolation device 1 sense water pressure on the water-main side and on the plumbing system side, respectively. A flow sensor 5 of the isolation device 1 senses water flowing in the isolation device 1.

A main valve 6 of the isolation device 1 disposed inside of a manifold 7 of the isolation device 1 is switchable between opened and closed positions based on measurements taken by the first and second water pressure sensors 3 and 4, respectively, and by the flow sensor 5. The lead lines for the components represented by reference numerals 3-6 point to locations within the isolation device 1 at which the corresponding components may be, but are not necessarily, located. It should be noted that these components may be located at various locations within the isolation device 1, as will be understood by those of skill in the art in view of the description provided herein.

A controller 10 is configured to perform a main valve control algorithm that processes measurement signals output by the first and second water pressure sensors 3 and 4, respectively, and by the flow sensor 5 and decides whether to open or close the main valve 6 based on the measurement signals, as will be described below in more detail.

The isolation device 1 is connected at an inlet 9 thereof with a water supply line 11 via a fitting 12 that complies with plumbing/pipe assembly techniques that are well known in the art. Such techniques may vary according to the plumbing codes and practices that apply to the location of the premises in which the isolation device 1 is installed. The water supply line 11 may be connected to a water-main (not shown) that provides potable water from a potable water source (not shown) to the premises. The isolation device 1 has a first outlet 13 that is connected to the plumbing system 14 of the premises by a fitting 15 that complies with plumbing/pipe assembly techniques that are well known in the art. Additional features and functionality that the isolation device 1 may have are described below in more detail.

The primary operations of the isolation device 1 will now be described with reference to FIG. 1. In accordance with a preferred embodiment, prior to operating the isolation device 1, the user provides input to the controller 10 via an input device 16 that is in communication with the controller 10. For exemplary purposes, the input device 16 is shown as being a keypad, but other types of input devices may be used. In accordance with this representative embodiment, the input to the controller 10 includes at least high and low pressure set points. The input may include additional parameters for various other computer programs that may be executed by the controller 10.

An On/Off switch 17 is energized and electricity is supplied to a power supply 18. This powers up the controller 10 and other associated electrical components. Preferably, the main valve 6 is normally closed and remains in the closed position unless opened by the controller 10, but at power up the controller 10 may send a signal to the main valve 6 to cause it to be placed in the closed position if it is not already in the closed position. The main valve 6 includes an electrically-controlled switch (not shown) that can move the main valve 6 from the opened position to the closed position, and vice versa.

After the user has set the high and low pressure set points for the controller 10, the user opens an On/Off valve 19 permitting water to flow from the water supply line 11 into the manifold 7 to fill the manifold. Preferably, a display monitor 21 is in communication with the controller 10 and is controlled by the controller 10 to display certain useful information, such as the level of water pressure inside of the manifold 7 as measured by the first water pressure sensor 3. Pressure readings displayed on the display monitor 21 may be observed be the user to determine if the current pressure readings are within the desired parameters, e.g., greater than the low pressure set point and less than the high pressure set point. The isolation device 1 may include an optional pressure gauge 22 that the user can view to ensure that the pressure measured by pressure sensor 3 corresponds to the pressure measured by then pressure gauge 22.

When pressure measurements are within the acceptable limits, i.e., in between the high and low pressure set points, and a demand for water is sensed, the controller 10 causes the main valve 6 to be moved to the opened position allowing water into the plumbing system 14. Demand for water from the plumbing system 14 is sensed by the second pressure sensor 4. When demand is requested, for example by opening a faucet or flushing a toilet, pressure within the plumbing system 14 will drop. The second pressure sensor 4 detects this drop and sends a request to the controller 10 to open the main valve 6 to provide water to the plumbing system 14. The second pressure sensor 4 may be a typical pressure switch for other plumbing applications, such as the pressure switch that is used to energize a pump in a well system.

When water is called for, and the main valve 6 opens, water flow will be detected by the flow sensor 5. When the demand ceases, in this example by shutting off the faucet or when the toilet valve shuts off, flow ceases, which is also detected by the flow sensor 5. The measurement signals are output by the flow sensor 5 to the controller 10. When the controller 10 detects that the demand has ceased, the controller 10 places the main valve 6 in the closed position and resets pending new demand.

Figure 2:
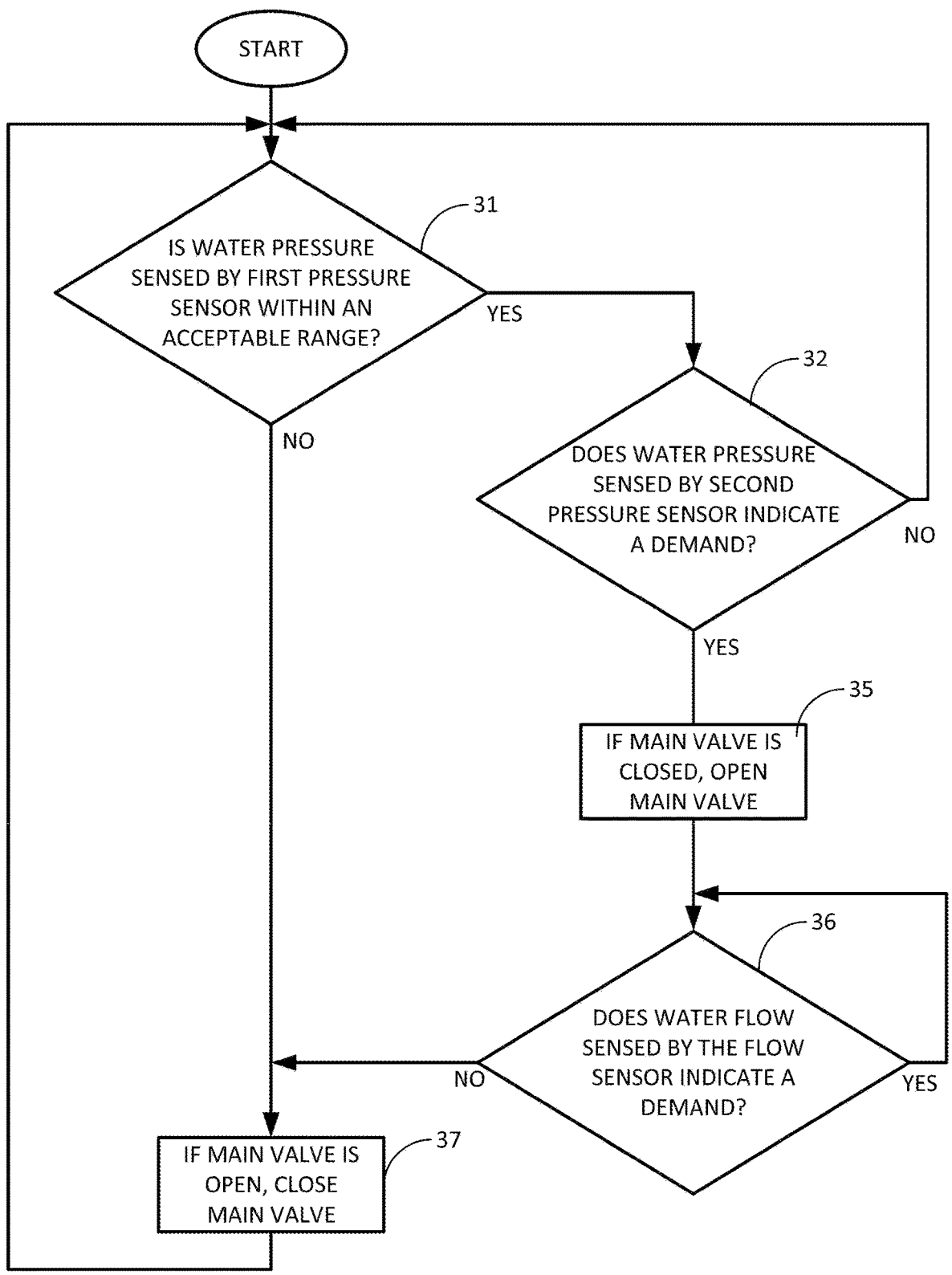
FIG. 2 is a flow diagram that demonstrates a main valve control algorithm performed by a controller of the isolation device shown in FIG. 1 in accordance with a representative embodiment.

FIG. 2 is a flow diagram that demonstrates the main valve control algorithm performed by the controller 10 in accordance with a representative embodiment. As indicated above, after the low and high pressure set points have been input to the controller 10, a startup procedure is performed during which the main valve 6 and the shut Off/On valve 19 are placed in the open positions to allow water to flow into the plumbing system 14 and into the manifold 7 until the water pressure as measured by the first water pressure sensor 3 and/or by the pressure gauge 22 indicate that the water pressure is at a desired level. The main valve 6 is then placed in the closed position. The flow diagram shown in FIG. 2 assumes that this startup procedure has already occurred. Thus, at the start of the algorithm represented by the flow diagram shown in FIG. 2, the plumbing system 14 is isolated from the water supply line 11 and is pressurized. In this state, the controller 10 is monitoring the measurement signals output from the first and second water pressure sensors 3 and 4, respectively, and from the flow sensor 5.

Block 31 represents the process of the controller 10 monitoring the measurement signal output from the first water pressure sensor 3 to determine whether or not the water pressure is above the low pressure set point and below the high pressure set point, i.e., whether or not the water pressure is within a permissible range of water pressure. If not, the process proceeds to block 37 at which the main valve 6 is placed in the closed position. As indicated above, in accordance with a preferred embodiment, the main valve 6 is normally closed, but if it is in the opened position, the controller 37 causes it to be placed in the closed position. The process may then return to block 31 at which the controller 10 continues to monitor the measurement signal output by the first water pressure sensor 3.

If a determination is made at block 31 that the water pressure is above the low pressure set point and below the high pressure set point, i.e., within a permissible range of water pressure, the process proceeds to block 32 at which a determination is made as to whether or not the water pressure sensed by the second water pressure sensor 4 indicates that there is currently a demand for water from the plumbing system 14, such as due to the flushing of a toilette. If not, the process may return to block 31 at which the controller 10 continues to monitor the measurement signal output by the first water pressure sensor 3. If a determination is made at block 32 that the water pressure sensed by the second water pressure sensor 4 indicates that there is currently a demand for water from the plumbing system 14, the process proceeds to block 35 at which the main valve 6 is placed in the opened position. The process then proceeds to block 36 at which a determination is made as to whether or not the flow sensor 5 indicates that a demand for water exists. As indicated above, as long as the flow sensor 5 detects water flowing, a demand still exists, and therefore the process will remain at block 36 until a determination is made by the controller 10 that the demand has ceased to exist.

When a determination is made by the controller 10 at block 36 that a demand does not exist, the process proceeds to block 37 at which the controller 10 causes the main valve 6 to be placed in the closed position. The process then returns to block 31 and resumes.

Figure 3:
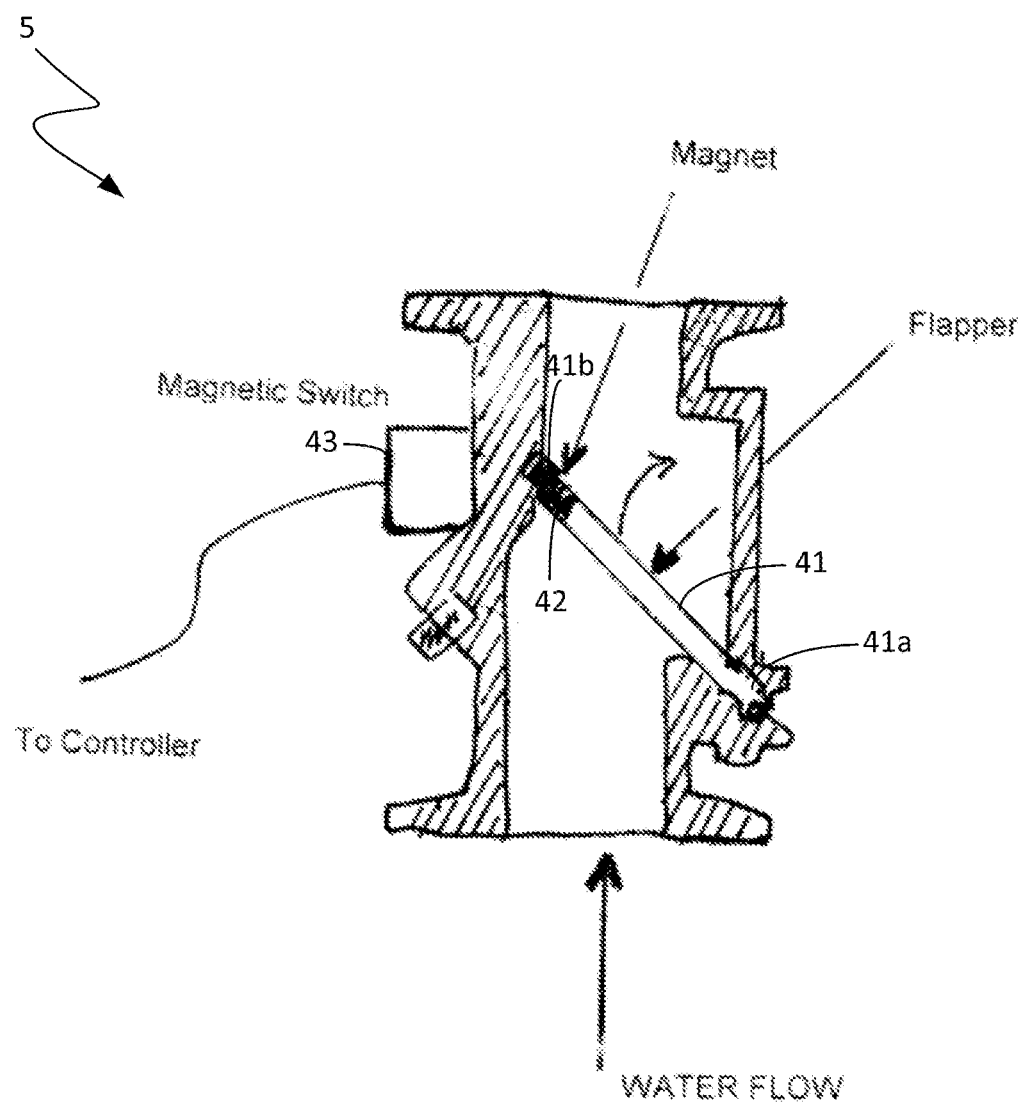
FIG. 3 illustrates a side cross-sectional view of a flow sensor of the isolation device shown in FIG. 1 in accordance with a representative embodiment.

FIG. 3 illustrates a side cross-sectional view of the flow sensor 5 shown in FIG. 1 in accordance with a representative embodiment. The flow sensor 5 may have various configurations. The configuration shown in FIG. 3 is only one of a variety of possible configurations. In accordance with this embodiment, the flow sensor 5 has a flapper 41 that is fixed on one end 41a and that is free to move on the opposite end 41b in response to water flow. The flapper 41 moves in the direction indicated by the arrow to an opened position in response to flow, functioning like the flapper in a swing check valve. When the water flow ceases, the flapper 41 returns to its closed position. FIG. 3 shows the flapper 41 in its closed position. Attached to the flapper 41 is a magnet 42. Mounted on the housing of the isolation device 1 is a magnetic sensor switch 43, such as a Hall effect sensor or a reed switch, for example. When the magnetic sensor switch 43 is "tripped" by the magnet 42 due to the flow commencing, the magnetic sensor switch 43 sends a first pulse to the controller 10. When the flow ceases, and the flapper 41 returns to its original, closed position, the magnet 42 triggers a second pulse that is sent by the magnetic flow switch 43 to the controller 10. The controller 10 recognizes the first and second pulses and the main valve 6 to close and then resets its program in anticipation of the next demand event. Separately, the flow sensor 5 can signal "flow" or "not flow" when installed in any appropriate system.

With reference again to FIG. 1, in accordance with a representative embodiment, the isolation device 1 includes a purging valve 51 and fittings 52 that permit the input water supply line 11, from any source, to be purged of suspected contaminated water while continuing to isolate the water contained in the balance of the plumbing system 14 from the water supply line 11. The purging valve 51 and fittings 52 are optional, but preferred.

Purging is accomplished in this embodiment by attaching a hose 54 to the fitting 52 and using the lever 53 to open the purging valve 51 with the hose 54 running into a drain or outside for the recommended time period necessary to purge the water supply line 11 from the water-main or well to the manifold 7. The main valve 6 is placed in the closed position prior to opening the purging valve 51 and remains in the closed position during purging. Because the main valve 6 remains in the closed position during purging, the plumbing system 14 above the manifold 7 remains isolated from the potentially contaminated water. In other embodiments, a drainage line (not shown) may be permanently attached to the isolation device 1 so that attaching a hose is not necessary.

In accordance with a representative embodiment, the isolation device 1 includes an air stem bleeder valve 55 that permits pressurization and/or drainage to provide for the isolation device 1 to be tested. The air stem bleeder valve 55 is optional, but preferred. To test for low pressure function, manually, the shut Off/On valve 19 is placed in the off position and the pressure is bled off of the manifold 7 using the air stem bleeder valve 55. The pressure readings are observed by the user and the isolation device 1 is triggered by opening a valve 61 on the sealed side of the plumbing system 14. If the main valve 6 does not respond to the demand and remains closed while triggering a low pressure alarm LED, and any other installed alarm modes, the system is working properly on low pressure monitoring and control. If the shut Off/On valve 3 is implemented as an electromechanical shut Off/On valve, this test can be automated when an electromechanical "demand" valve is used for valve 61 on the sealed side of the plumbing system 14 and the controller 10 is programmed appropriately.

As indicated above, preselected parameters, such as the low pressure and high pressure set points, can be input to the controller 10 by the user using the input device 16. Alternatively, some or all of these parameters can be factory settings. Allowing some or all of the parameters to be set by the user provides the isolation device 1 with additional flexibility.

The controller 10 is typically a microcontroller executing software, firmware or a combination thereof, but may be any suitable processor or processing device, including, for example, a microprocessor, a field programmable gate array (FPGA), a programmable logic array (PLA), an application specific integrated circuit (ASIC),a digital signal processor (DSP), etc.

The controller 10 typically includes on-board memory for storing computer instructions comprising the main valve control algorithm and the aforementioned parameters. Alternatively, the controller 10 may be in communication with an external memory device 70 that stores the instructions and/or the parameters.

In accordance with a representative embodiment, the controller 10 communicates "out of parameter range" to one or more external notification devices, such as LEDs or other indicators, as an alert of high or low pressure that violate the high and low pressure set points, respectively. Other types of alerts include sending an email, text, etc., as an alert to a notification device, such as a handheld device (e.g., an iphone) or other device (e.g., a personal computer), and/or displaying the alert on the display monitor 21. Preferably, the display monitor 21 is driven by the controller 10 to display the current pressure measured by the first and second water pressure sensors 3 and 4, respectively, and the flow indication measured by the flow sensor 5. The display monitor 21 may also display stored historical pressure readings and alarms including the date and time of the events. The controller 10 preferably has a data logger that logs information relating to the events, which can be useful in debugging problems with the plumbing system 14, the isolation device 1 and even the water supply line 11 and/or water-main. These readings may be obtained from the controller 10 data logger in response to requests entered by the user on the input device 16 and displayed on the display monitor 21.

If out of parameter range readings on the low pressure side are detected, the main valve 6 is placed in the closed position and preferably alarm/alerts are sent to one or more of the notification devices. The main valve 6 preferably remains closed pending manual reset input entered on the input device 16 by the user.

If out of parameter range readings on the high side are detected, preferably alarms are energized and/or alerts are sent as indicated above. Preferably the main valve 6 will remain in the closed position, or shut down, pending bypass input from the user, which preferably is input to the controller 10 via the input device 16. The high pressure alarms/alerts and shut down can be disabled by the user to allow multiple uses of the plumbing system 14 prior to repairs being made to correct the high pressure condition.

The controller 10 preferably has a delay to allow transient high pressure readings, such as a high pressure "pulse" from a toilet valve closure, for example, to be permitted and not trigger alarms or shut down the system.

To test for high pressure, the user closes the main valve 6, typically by entering a preselected command to the controller 10 via the input device 16, and introduces air pressure through the air stem bleeder valve 55 using an air compressor. The pressure readings are observed and the isolation device is triggered by opening the valve 61 on the sealed side of the plumbing system 14. If the main valve 6 does not respond to the demand and remains closed while triggering the high pressure alarm LED, and any other installed alarm modes, the isolation device is working properly in the high pressure control mode.

The main valve 6 of the isolation device 1, the controller 10, and the sensors 3-5 are powered by a power supply 65 that preferably has a battery backup 66 in case of power failure. The battery backup 66 preferably includes an auxiliary power input 67 for an external battery (not shown).

In accordance with a representative embodiment, the controller 10 is configured to receive via the input device 16 parameters associated with an "idle mode" setting. The idle mode setting parameters prevent the main valve 6 from opening even if the second water pressure sensor 4 detects a demand from the plumbing system 14. This feature can prevent extensive flooding if a leak develops in any component of a plumbing system 14 while the user, or the owner or renter of the premises, is not present.

As indicated above, the controller 10 preferably is configured to send notifications, such as alerts, to external notification devices, such as a smartphone, for example. In addition, the controller 10 preferably can be configured to send control signals to external devices in response to out of parameter range measurements. For example, the controller 10 may send output a control signal to a hot water heater that is suitable to shut off power or gas heaters in hot water heaters.

In addition, the controller 10 can be configured to communicate over a WiFi network located at the premises to allow the controller 10 to communicate with other devices, such as a smartphone, or personal computers, for example, over the Internet and/or over a cellular or wireless communications network. This feature allows a user or technician to use such a device to input parameters to the controller 10 remotely, to test the isolation device 1 remotely, to debug the isolation device 1 and/or the plumbing system 14 remotely, to receive notifications (e.g., alerts) from the controller 10 remotely, to enter the aforementioned idle mode setting remotely, etc.

Figure 4:
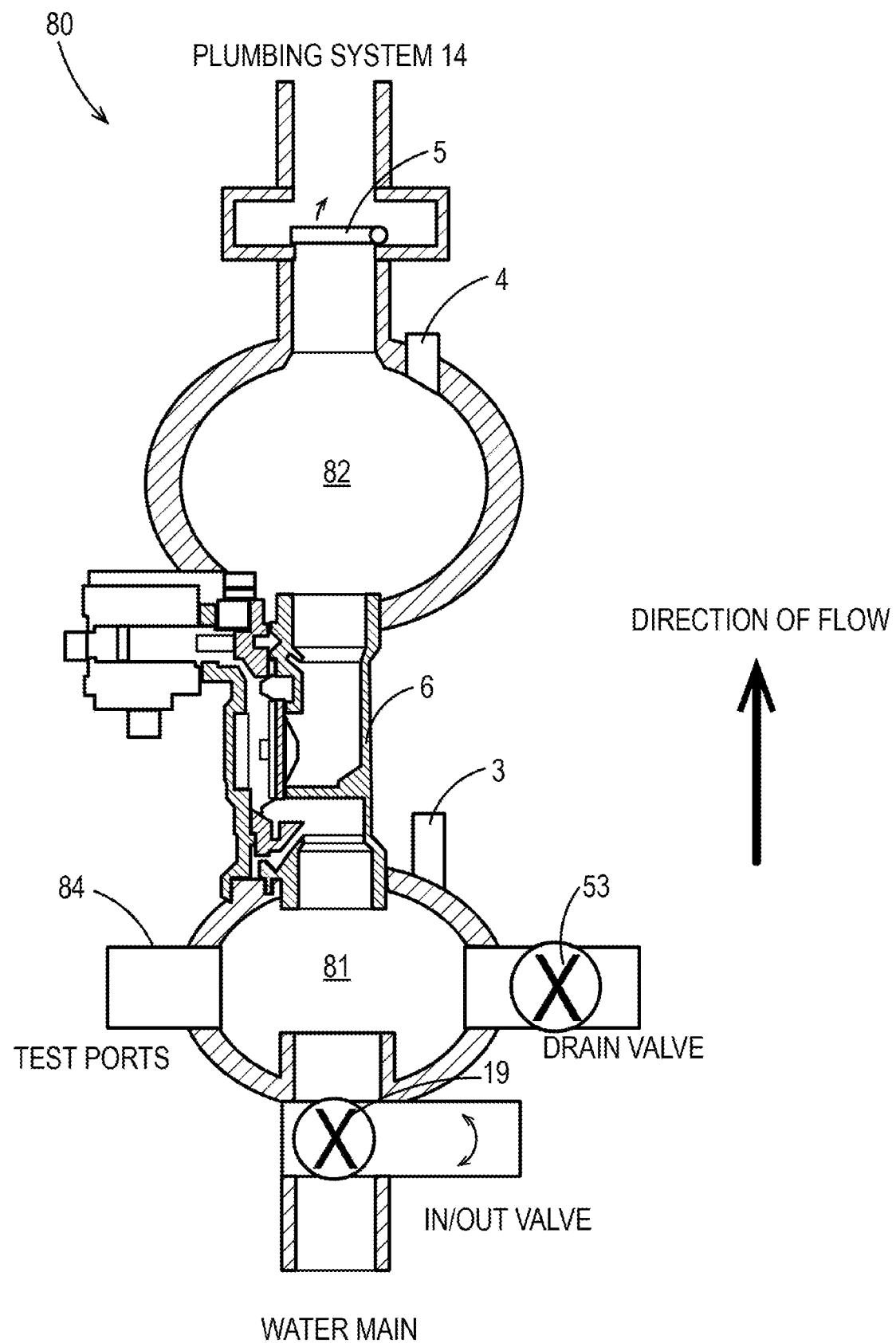
FIG. 4 illustrates a cross-sectional view of the isolation device in accordance with another representative embodiment.

FIG. 4 illustrates a cross-sectional view of the isolation device 80 in accordance with another representative embodiment. As indicated above, the isolation device may have a variety of configurations. The configuration shown in FIG. 4 is an example of another possible configuration for the isolation device. In accordance with this representative embodiment, the isolation device 80 has first and second chambers 81 and 82, respectively, which are interconnected by the main valve 6. An example of an electrically-controllable valve that is suitable for use as the main valve 6 is a solenoid valve having part number 21WN6KB250 manufactured by a company called Granzow of Charlotte, N.C. It should be noted, however, that the isolation device disclosed herein is not limited in regard to the components that are used to accomplish the functions described herein.

The first and second water pressure sensors 3 and 4 are interconnected with the first and second chambers 81 and 82, respectively, of the isolation device 80 for sensing water pressure on the water-main side and on the plumbing system side, respectively. The flow sensor 5 of the isolation device 80 senses water flowing in the isolation device 80. As indicated above, the main valve 6 is switchable between opened and closed positions based on measurements taken by the first and second water pressure sensors 3 and 4, respectively, and by the flow sensor 5.

The operations, features and advantages of the isolation device 80 are the same as those described above with reference to the isolation device 1 shown in FIG. 1. The controller 10 (FIG. 1) performs the main valve control algorithm that processes measurement signals output by the first and second water pressure sensors 3 and 4, respectively, and by the flow sensor 5 and decides whether to open or close the main valve 6 based on the measurement signals, as described above with reference to FIG. 1. The communication between the isolation device 80 and the controller 10 is not shown in FIG. 4 for ease of illustration. The isolation device 80 may also include test ports 84 for testing the isolation device 80.

The isolation device 1 is connected at an inlet 9 thereof with a water supply line 11 via a fitting 12 that complies with plumbing/pipe assembly techniques that are well known in the art. Such techniques may vary according to the plumbing codes and practices that apply to the location of the premises in which the isolation device 1 is installed. The water supply line 11 may be connected to a water-main (not shown) that provides potable water from a potable water source (not shown) to the premises. The isolation device 1 has a first outlet 13 that is connected to the plumbing system 14 of the premises by a fitting 15 that complies with plumbing/pipe assembly techniques that are well known in the art. Additional features and functionality that the isolation device 1 may have are described below in more detail.

It can be seen from the above that the isolation device and method provide many functions and advantages that are not provided by known solutions, some of which include the following:

(1) monitoring, on water-main side, high pressure and low pressure, and optionally providing alert notification, and logging, of pressures outside of preselected parameters;

(2) preventing the main valve 6 from opening if pressures are outside of preset parameters;

(3) the main valve 6 preferably is "Normally CLOSED" so that it does NOT have to be directed to close; this means that in failure, the valve fails CLOSED, i.e., it does not have to "do" anything;

(4) any water contained in the plumbing system 14 is prevented from draining away due to a faulty check valve or back-flow preventor, thereby preserving the water for possible use as emergency drinking water that various agencies recommend that all persons keep on hand;

(5) provides the ability to purge the waterpipe connecting the building to the water-main without routing possible contaminated water through the plumbing system 14; this eliminates the need to flush and/or drain the plumbing system 14 and components supplied by it, including hot water heaters, icemakers, filters, washing machines, showers and tubs while protecting them from possible contamination by water that has been contaminated prior to entry into the plumbing system 14;

(6) monitors high pressure and can be adapted to alert the user of pressure that is higher than the selected high pressure parameter, which allows the user to be aware of input pressure that is higher than desired for building's plumbing system components; this allows the user to take steps to repair the cause of the high pressure, usually from a failed pressure regulator; this, in turn, prevents damage to the plumbing system components;

(7) monitors, on the "plumbing system side (user)," pressure drop, indicating demand (use or a leak).

(8) all pressure parameters can be set by the user rather than preset, e.g., at the factory.

(9) all actions resulting from pressure too high or too low are automatic, requiring no input from the user;

(10) controller 10 "watches" input ("water-main side") pressures and reacts to them; it controls the main valve 6 and can communicate any "outside parameter" issues with the user via cell, email, etc.

(11) the controller 10 can be interfaced with a "Home Controller" of the type used for a "Smart Home"/IOT/Alarm system to allow notification to the user via that Home Controller; the controller 10 can interface with the Home Controller to query if user is not home or asleep and flag/report water demand sensed by the sensors 4 and/or 5; use demand if user is not home or is sleeping would be an indication of a leak in the plumbing system 14; main valve opening can be disallowed when user is not at home or sleeping unless certain uses such as an ice maker or filter backwash are programmed into the controller 10;

(12) can provide for the isolation of the plumbing system 14 if lead, biological or chemical contamination is sensed (by a seperate sensor) when directed by an "IOT" controller to do so.

(13) if the controller 10 is not coupled to a IOT Home Controller, the "idle mode" setting can be set to prevent any water use even if the plumbing system 14 indicates water demand; this prevents or reduces flooding from events that may occur when the building is not occupied;

(14) the controller 10 can be programmed by the user to indicate a selected time period to run tests of the isolation device; as noted above, this testing process can be automated;

(15) the controller 10 can be programmed by the user to indicate a time period when the flushing of a hot water heater is desired; this process can also be automated.

(16) the sensing and control of the water pressure set points can be tested;

(17) provides a low-cost solution to achieve all of the needed actions; contamination protection of the plumbing system 14 and of the water in the plumbing system 14 as well as leak detection of the plumbing system 14;

(18) the isolation device is relatively easy to install into a building's plumbing system;

(19) components can be assembled such that maintenance of any wear points, seals, etc. in the device can be accomplished;

(20) preferably has a battery backup so that the isolation device will still function if there is a local power failure; preferably includes an auxiliary input so that any charged 12 volt battery (such as an automotive battery) can be used to operate the isolation device in the event of a prolonged power failure.

(21) obviates the need for a separate moisture sensor to detect a leak in the system plumbing 14;

(22) preferably provides the option of manually operating the main valve to permit use of water even if pressure parameters are exceeded;

(23) ignores transient pressure changes caused by normal plumbing system operations such as the pressure spike from a toilet valve closing.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. For example, while the flow sensor 5 has been described as being disposed in the isolation device, it could be disposed father downstream within the plumbing system 14, such as near outlet 13, but on the plumbing system side, for example. Other variations to the disclosed embodiments can be understood and effected by those skilled in the art, from a study of the drawings, the disclosure, and the appended claims.

What is claimed is:

1. An isolation device for isolating a plumbing system of a premises from a potable water source, the isolation device comprising:

a housing having an inlet adapted to be connected to a water supply line through which water from the potable water source is intended to flow, and having an outlet adapted to be connected to a plumbing system of a premises;

a first water pressure sensor coupled to the housing, the first water pressure sensor sensing water pressure of water flowing through the water supply line and outputting a first measurement signal, wherein the first measurement signal is indicative of the water pressure of the water flowing through the water supply line;

a second water pressure sensor coupled to the housing, the second water pressure sensor sensing water pressure of water flowing through the plumbing system and outputting a second measurement signal, wherein the second measurement signal is indicative of the water pressure of the water flowing through the plumbing system;

a main valve coupled to the housing and disposed in between the first and second water pressure sensors, the main valve being electrically-controllable;

a flow sensor sensing a flow of water in the isolation device and outputting a third measurement signal; and a controller electrically coupled to the first and second water pressure sensors and to the flow sensor, the controller performing a main valve control algorithm that sends one or more control signals to the main valve to cause the main valve to be placed in an opened position or a closed position based on at least one of the first, second and third measurement signals, wherein when the main valve is in the closed position, water in the plumbing system is isolated from water in the water supply line, and wherein if the main valve is in the closed position and a demand for water in the plumbing system exists, the controller causes the main valve to be placed in the opened position if the first and second measurement signals indicate that the water pressure flowing through the water supply line and through the plumbing system is greater than a low pressure set point and less than a high pressure set point, respectively.

2. The isolation device of claim 1, wherein the main valve has a normally closed configuration, and wherein the controller causes the main valve to remain in the closed position if the first or second measurement signals indicate that the water pressure flowing through the water supply line or through the plumbing system is less than the low pressure set point or greater than the high pressure set point, respectively.

3. The isolation device of claim 2, wherein the controller monitors the second measurement signal to determine if the demand for water in the plumbing system exists by determining whether the second measurement signal indicates that the water pressure of the water flowing through the plumbing system has decreased.

4. The isolation device of claim 3, wherein if the third measurement signal indicates that the flow of water in the isolation device is such that the demand for water no longer exists, the controller causes the main valve to be placed in the closed position.

5. The isolation device of claim 2, wherein if the main valve is in the opened position and the first or second measurement signals indicates that the water pressure of the water flowing through the water supply line or through the plumbing system is either less than the low pressure set point or greater than the high pressure set point, respectively, the controller causes the main valve to be placed in the closed position.

6. The isolation device of claim 1, further comprising:
a purging valve adapted to permit input water flowing through the water supply line to be purged while continuing to isolate the water contained in the plumbing system from the water flowing through the water supply line.

7. The isolation device of claim 6, further comprising:
an air stem bleeder valve that permits the isolation device to be pressurized or drained during testing of the isolation device, while continuing to isolate the water contained in the plumbing system from the water supply line.

8. The isolation device of claim 7, further comprising:
a pressure gauge that visually displays the water pressure of the water flowing in the isolation device.

9. The isolation device of claim 1, further comprising:
an input device in communication with the controller, wherein the low pressure set point and the high pressure set point are parameters that are input to the controller by a user via the input device.

10. The isolation device of claim 1, wherein the low pressure set point and the high pressure set point are parameters that are preset in the controller as factory settings.

11. The isolation device of claim 1, wherein if the main valve is in the opened position and the controller causes the main valve to be placed in the closed position, the controller outputs an alert signal to an external device to notify a user that the main valve has been placed in the closed position.

12. The isolation device of claim 11, wherein the controller is in communication with a wireless communications network and wherein the alert signal is sent over the wireless communications network to the external device.

13. The isolation device of claim 12, wherein the external device is at least one of a computer and a handheld mobile device, and wherein the alert signal is sent over the wireless communications network as at least one of a text, an email and a phone call.

14. The isolation device of claim 13, wherein the controller is in communication with an Internet of Things (IOT) home controller of the premises, and wherein the IOT home controller communicates at least one of the text, the email and the phone call over the wireless communications network to the external device.

15. A method of using an isolation device to isolate a plumbing system of a premises from a potable water source, wherein a housing of the isolation device has an inlet connected to a water supply line through which water from the potable water source flows, and has an outlet connected to the plumbing system, the method comprising:

with a first water pressure sensor, sensing water pressure of water flowing through the water supply line and outputting a first measurement signal, wherein the first measurement signal is indicative of the water pressure of the water flowing through the water supply line;

with a second water pressure sensor, sensing water pressure of water flowing through the plumbing system and outputting a second measurement signal, wherein the second measurement signal is indicative of the water pressure of the water flowing through the plumbing system;

with a flow sensor, sensing a flow of water in the isolation device and outputting a third measurement signal;

with a controller electrically coupled to the first and second water pressure sensors and to the flow sensor, performing a main valve control algorithm that sends one or more control signals to a main valve of the isolation device to cause the main valve to be placed in an opened position or a closed position based on at least one of the first, second and third measurement signals, the main valve being disposed in between the first and second water pressure sensors and being electrically-controllable, wherein when the main valve is in the closed position, water in the plumbing system is isolated from water in the water supply line; and with the controller, if the main valve is in the closed position and a demand for water in the plumbing system exists, causing the main valve to be placed in the opened position if the first and second measurement signals indicate that the water pressure flowing through the water supply line and through the plumbing system is greater than a low pressure set point and less than a high pressure set point, respectively.

16. The method of claim 15, wherein the main valve has a normally closed configuration, and wherein the controller causes the main valve to remain in the closed position if the first or second measurement signals indicate that the water pressure flowing through the water supply line is less than the low pressure set point or greater than the high pressure set point, respectively.

17. The method of claim 16, wherein the controller monitors the second measurement signal and determines that the demand for water in the plumbing system exists by determining whether the second measurement signal indicates that the water pressure of the water flowing through the plumbing system has decreased.

18. The method of claim 17, wherein if the third measurement signal indicates that the flow of water in the isolation device is such that the demand for water no longer exists, the controller causes the main valve to be placed in the closed position, and wherein if the main valve is in the opened position and the first or second measurement signals indicate that the water pressure flowing through the water supply line is less than the low pressure set point or greater than the high pressure set point, respectively, the controller causes the main valve to be placed in the closed position.

* * * * *